(12) United States Patent
Arbuckle

(10) Patent No.: US 7,387,453 B2
(45) Date of Patent: Jun. 17, 2008

(54) CAMERA SUPPORT AND MOUNTING ASSEMBLY

(75) Inventor: James F. Arbuckle, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 440 days.

(21) Appl. No.: 11/219,606

(22) Filed: Sep. 2, 2005

(65) Prior Publication Data

US 2007/0053681 A1    Mar. 8, 2007

(51) Int. Cl.
*G03B 17/00* (2006.01)

(52) U.S. Cl. .................. 396/419; 396/427; 348/373; 348/143

(58) Field of Classification Search ........... 396/419, 396/422, 427; 348/373, 825, 143
See application file for complete search history.

(56) References Cited

U.S. PATENT DOCUMENTS

| 3,638,502 | A |   | 2/1972 | Leavitt |
|---|---|---|---|---|
| 3,720,147 | A |   | 3/1973 | Bemis |
| 3,739,703 | A |   | 6/1973 | Behles |
| 4,080,629 | A |   | 3/1978 | Hammond |
| 4,217,606 | A |   | 8/1980 | Nordmann |
| 4,736,218 | A |   | 4/1988 | Kutman |
| 4,833,534 | A |   | 5/1989 | Paff |
| 4,901,146 | A |   | 2/1990 | Struhs |
| 4,984,089 | A |   | 1/1991 | Stiepel |
| 5,028,997 | A |   | 7/1991 | Elberbaum |
| D325,212 | S |   | 4/1992 | Elberbaum |
| 5,121,215 | A | * | 6/1992 | Boers et al. ............... 348/373 |
| 5,181,120 | A |   | 1/1993 | Hickey |
| 5,223,872 | A |   | 6/1993 | Stiepel |
| 5,394,209 | A |   | 2/1995 | Stiepel |
| 5,418,567 | A |   | 5/1995 | Boers |
| 5,627,616 | A |   | 5/1997 | Sergeant |
| D388,450 | S |   | 12/1997 | Hamano |
| 5,852,754 | A |   | 12/1998 | Schneider |
| D412,924 | S |   | 8/1999 | Hiraguchi |
| 5,966,991 | A |   | 10/1999 | Gosselin |
| 6,027,257 | A |   | 2/2000 | Richards |
| 6,268,882 | B1 |   | 7/2001 | Elberbaum |
| 6,354,749 | B1 |   | 3/2002 | Pfaffenberger, II |
| 6,357,936 | B1 | * | 3/2002 | Elberbaum ............... 396/427 |
| 6,715,940 | B2 | * | 4/2004 | Top et al. ............... 396/427 |
| 6,742,942 | B2 | * | 6/2004 | Hering et al. ............. 396/427 |
| 6,860,654 | B1 | * | 3/2005 | Ching-Wen .............. 396/427 |
| 6,894,724 | B2 |   | 5/2005 | Patel et al. |
| 2002/0044214 | A1 | * | 4/2002 | Hovanky ................. 348/373 |
| 2003/0103161 | A1 | * | 6/2003 | Tatewaki et al. .......... 348/375 |
| 2004/0032492 | A1 | * | 2/2004 | Wada et al. .............. 348/143 |
| 2004/0047623 | A1 | * | 3/2004 | Top et al. ............... 396/427 |
| 2006/0147194 | A1 | * | 7/2006 | Jones ................... 396/427 |

\* cited by examiner

*Primary Examiner*—Christopher E. Mahoney
*Assistant Examiner*—Warren K Fenwick

(57) ABSTRACT

The present invention is a camera mounting structure that is made using a minimal number of parts that are attached together without the use of hardware or fasteners. One or more motors are each mounted to a support bracket using locking tabs, boss registers, clips and/or tension members. Pins or registers on each motor correspond to openings or slots on each support bracket for precise positioning of the motor when attached to the bracket. Each motor support bracket is, in turn, attached to a rotatable ring that moves in a base without the use of hardware or fasteners. Motors and brackets are provided for the pan and tilt movements of the camera. The rotatable ring is journaled directly to the based using an annular channel in the base to further minimize the number of parts making up the mounting assembly, allowing for easy assembly, disassembly, service and repair.

48 Claims, 20 Drawing Sheets

CAMERA SUPPORT AND MOUNTING ASSEMBLY

BACKGROUND OF THE INVENTION

1. Field of the Invention

The present invention relates to camera enclosures, and more particularly to a mounting and support structure for a surveillance camera system that allows a full range of movement (pan and tilt) for a camera deployed thereon, the mounting structure itself being assembled without the use of hardware fasteners in order to simplify assembly and allow easy access for maintenance and repair.

2. Description of the Prior Art

Closed circuit television (CCTV) cameras and surveillance systems are well known in the prior art. Many camera mount systems include domed camera enclosures to both protect the camera and create an aesthetically pleasing appearance while hiding the camera from the public.

Of particular importance is the field of vision of the camera, so it is desirable to provide camera mounts and enclosures that allow for the widest possible range of movement of the camera to provide for a full field of vision of a given area. Many cameras mounting systems allow for the camera to swivel, rotate, and tilt so that the camera is capable of capturing a view of a large area. Oscillating mechanical rotary bases such as that disclosed in U.S. Pat. No. 6,894,724 are known in the art, allowing devices such as cameras to oscillate back and forth between defined limits. The limits of the oscillation of the camera can be easily adjusted to increase or decrease the size of the area to be scanned.

The continued use and movement of a camera on its mounting structure over a long period of time will inevitably lead to fatigue and failure of component parts. Instead of replacing an entire camera system, it is generally more cost effective to simply repair or replace a defective part and then place the camera system back into operation. Because such camera systems may be mounted at locations that are out-of-the-way or difficult to reach, it is desirable to provide a mounting structure that allows easy access for maintenance and/or repair in the field. Alternatively, if the user elects to remove a failed camera system, it is beneficial to have quick and easy access to the removed system for repair at a shop.

Prior art mounting structures traditionally use screws, bolts, rivets and/or other fasteners to hold together the various parts of the structure. These hardware pieces require special tools for access and removal, complicating the task of accessing the structure for maintenance or repair, especially with multiple or different kinds of fasteners. It can be a frustrating experience for a user to climb to a remote location to repair a camera system, and then accidentally drop a removed screw or nut that is needed for reassembly. Additionally, fasteners such as screws and bolts may become worn and/or stripped over time, creating even more difficulty when repairing the camera mount or enclosure. Precise and predictable camera movements are important for CCTV systems, so that cameras may be trained on specific selected areas to obtain desired views. The need for precision movement of the camera becomes more acute when the camera zooms in on distant objects. It is therefore important to have a reliable camera mount and enclosure to accomplish these goals. Unfortunately, the use of fasteners in prior art mounting structures may inevitably lead to loosening of the fasteners after long periods of use, resulting in loose connections between the various parts of the camera mounting structure. This can result in abnormal wear of the moving parts (especially the inter-engaging gears between motors and moving parts) and/or unpredictable movements of the camera, and may lead to early failure of component parts, or possible disassembly of the mounting structure. It is therefore desirable to provide secure attachment of the various moving parts of a camera mounting structure in order to avoid fatigue and failure of those parts, and to maintain proper and predictable movement of the camera mounted thereon.

It is also desirable to provide a camera enclosure having a minimal number of internal component parts in order to reduce manufacturing costs. Such simplified structures may be more quickly assembled and disassembled, thereby reducing labor costs for both manufacturing and maintenance/repair. Fewer parts generally translates to a need for fewer tools for disassembling, repairing, and re-assembling the structure. Finally, fewer parts, including moving parts, will also reduce the chance of failure from the repeated motion of the camera mount.

SUMMARY OF THE INVENTION

The present invention is a CCTV or surveillance camera mounting structure and enclosure that is made up of a minimal number of parts that are attached together using tension, clips and/or snap fit without the use of hardware or fasteners. At least one motor is mounted to a support bracket using a combination of locking tabs, boss registers, clips and/or tension members. One or more pins or registers on the motor correspond to openings or slots on the support bracket for precise positioning of the motor when attached to the bracket. The motor support bracket is, in turn, attached to a rotatable ring that moves in a base using a separate combination of locking tabs, boss registers, clips and/or tension members. One or more positioning tabs and/or slots on the motor bracket further assure that the bracket is properly and precisely mounted to the ring. Such a bracket is provided for the pan or scan motor which rotates the camera about a first axis, and a separate bracket is provided for the tilt motor which rotates the camera about a second usually perpendicular axis.

The mounting structure of the present invention includes a base platform that is attached to the ceiling, wall, pendulum or other location or structure where the camera system is deployed. The base is provided with appropriate mounting structures such as screw openings and the like for attachment at the deployment location. The base is in the shape of a ring having an open interior. A separate single-piece ring assembly fits into the base, and is capable of rotating therein. The base provides an immovable inner ring, and the ring assembly forms a movable outer ring. Instead of providing separate bearing structures between the outer ring and the base, the outer ring itself is journaled into the base to form a bearing, with balls or other bearing units provided in an annular groove in the base where it contacts the outer ring. This simplified structure eliminates unnecessary moving parts that could fail. This structure also provides additional space inside the inner ring for the camera and motors, allowing for larger versions of these components to be used, and providing a lower overall center of gravity for the assembly.

The outer ring that is journaled into the base includes the locking tabs, boss registers, clips and/or tension members that hold one or more of the motor mount brackets of the invention. The immovable inner ring on the base is provided with gear teeth around the circumference of the inner ring.

The pan motor (that is attached to a bracket that is attached to the movable outer ring) has a gear attached to its spindle that corresponds with and fits into the gear teeth of the inner ring. Once the pan motor gear is engaged with the teeth of the inner ring, operation of the pan motor causes the outer ring to rotate relative to the inner ring and base.

The tilt motor is attached to a separate bracket that is also attached to the movable outer ring. A separate camera mounting bracket is rotatably attached to the tilt motor bracket using a snap fit, or locking tabs, boss registers, clips and/or tension members. The camera bracket includes an arcuate section having gear teeth thereon. The tilt motor has a gear attached to its spindle that corresponds with and fits into the gear teeth of the camera bracket. Once the tilt motor gear is engaged with the teeth of the camera bracket, operation of the tilt motor causes the camera bracket (and hence, the camera mounted thereon) to move relative to the outer ring and tilt support bracket.

In some embodiments, an inner dome-shaped bracket having a camera opening therein may be provided that fits into the movable outer ring. The dome bracket moves with the ring, and helps secure and make true the positions of the pan and tilt brackets on the outer ring.

A heat sink may also be provided in the form of a die cast metallic (preferably aluminum) cylindrical part having a plurality of radially extending heat-dispersing fins thereon. The heat sink is attached directly to the electronic PC board supporting the power supply so as to disperse heat away from this board. In order to avoid electrical conductivity, the metallic heat sink is preferably painted or coated with an anodized material. In one embodiment, one end of the cylindrical heat sink is closed, and an opening is provided therein for receiving electronic modules such as a translating device.

It is therefore an object of the present invention to provide a camera mounting assembly that is made up of a minimal number of parts that are attached together without using hardware or fasteners.

It is also an object of the present invention to provide a camera mounting assembly that provides secure attachment of its various parts without the use of hardware or fasteners so as to provide precise and predictable camera movements and operation.

It is also an object of the present invention to provide a camera mounting assembly that may be easily assembled and disassembled in the field or at a shop without the need for multiple tools.

It is also an object of the present invention to provide a camera mounting assembly in which the base is journaled directly to a movable ring without using a separate bearing structure.

Additional objects of the invention will be apparent from the detailed descriptions and the claims herein.

DETAILED DESCRIPTION

Figure 1:
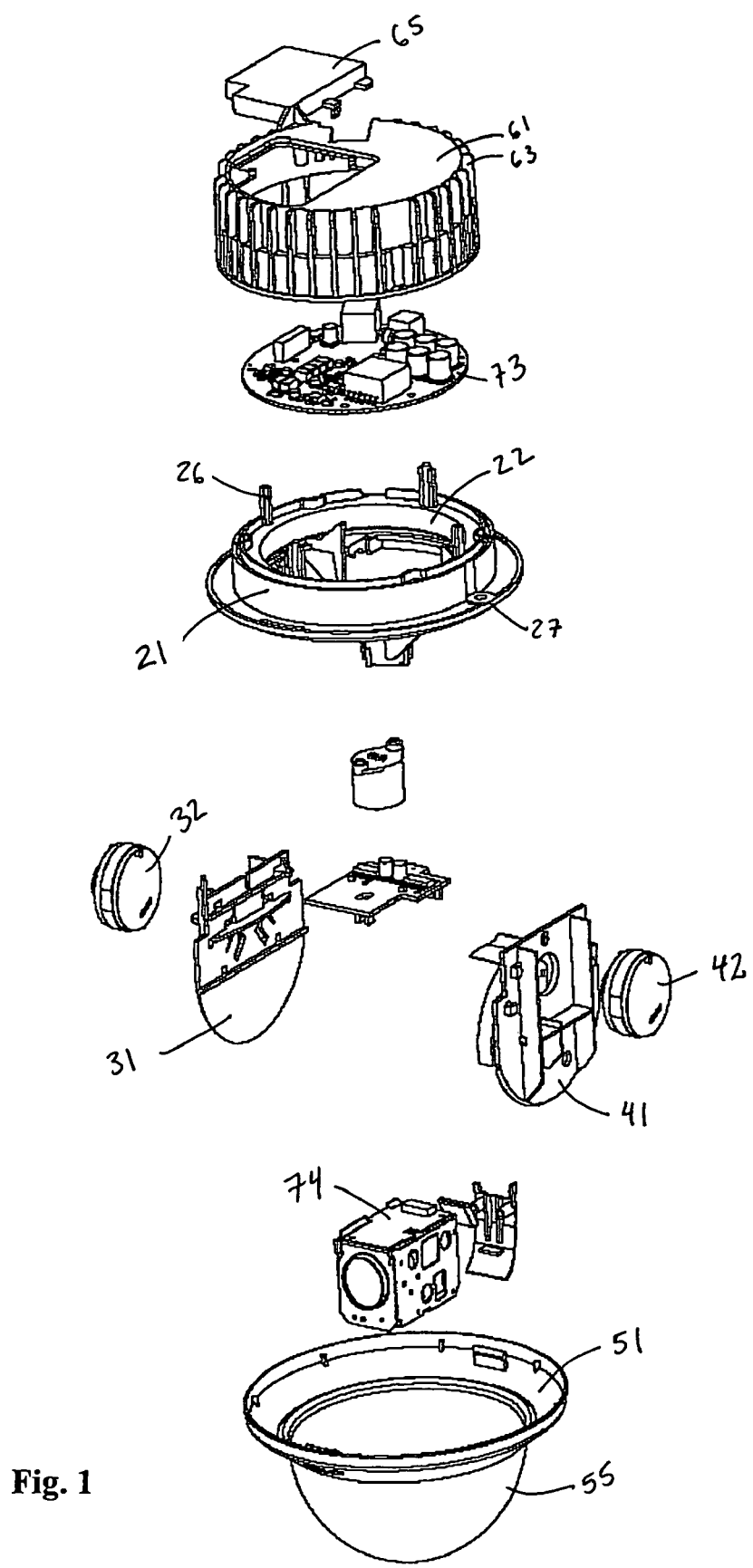
FIG. 1 is an exploded view of an embodiment of the present invention.
Figure 2:
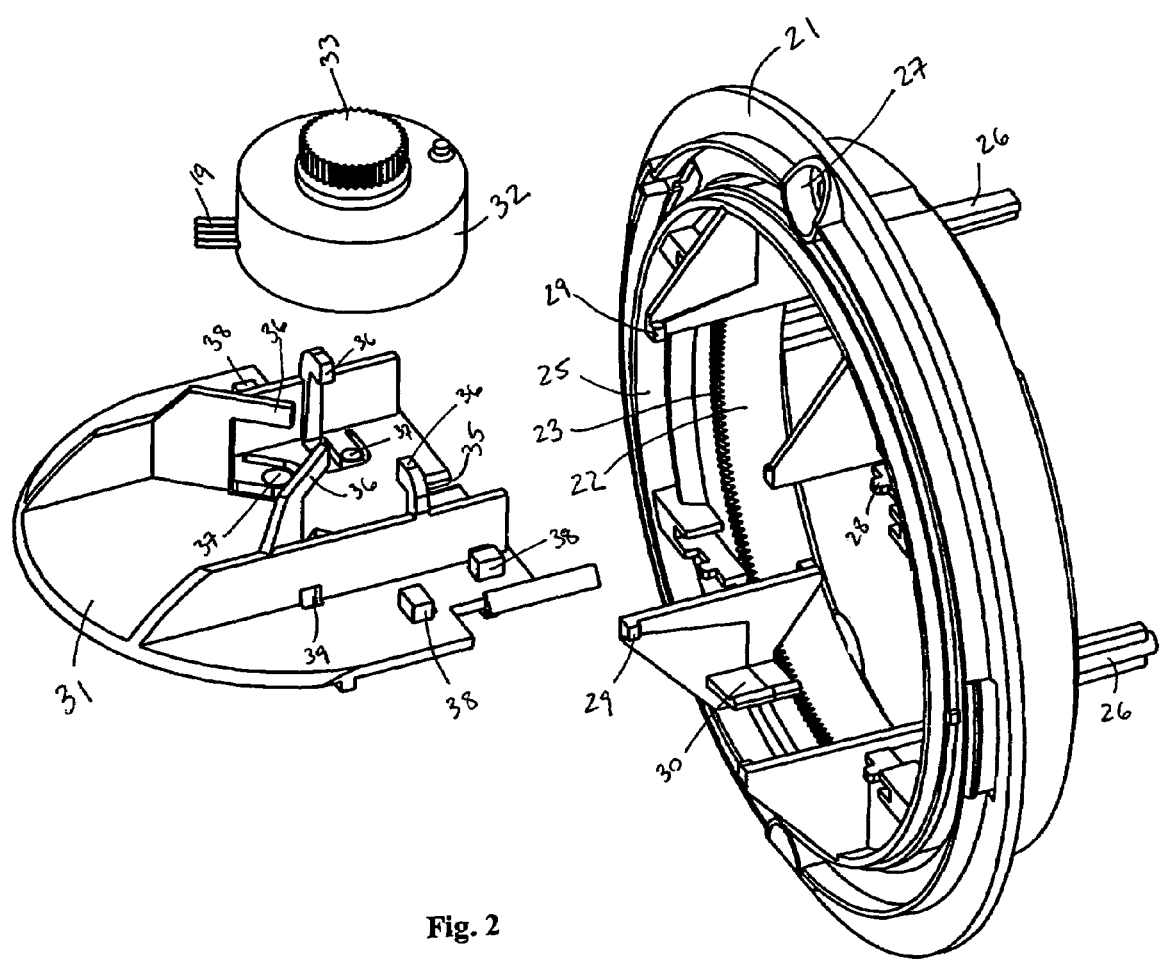
FIG. 2 is a side perspective and partially exploded view an embodiment of the present invention showing a pan motor mounting assembly.
Figure 2A:
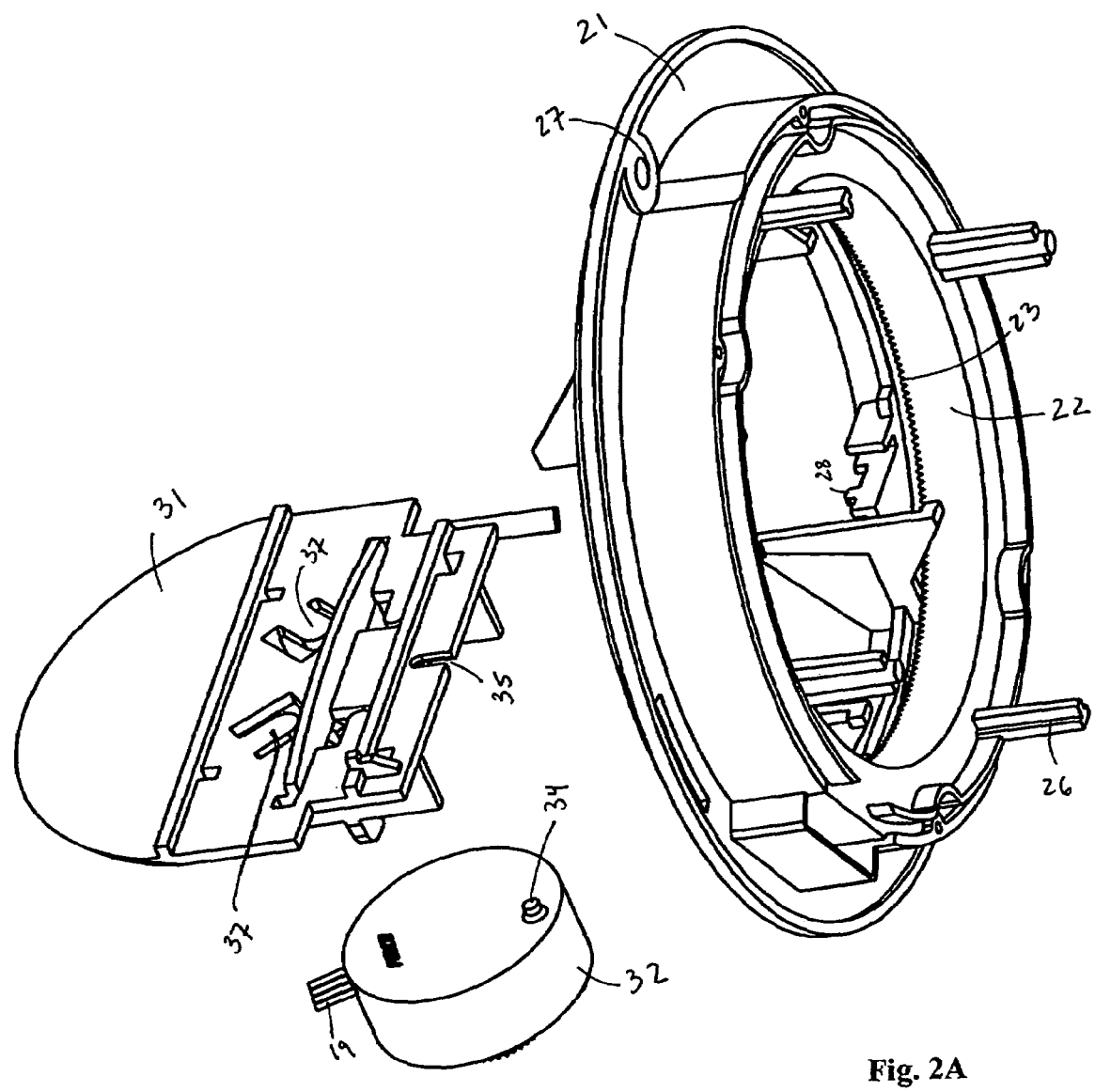
FIG. 2A is an opposite side perspective and partially exploded view of the embodiment of FIG. 2.
Figure 3A:
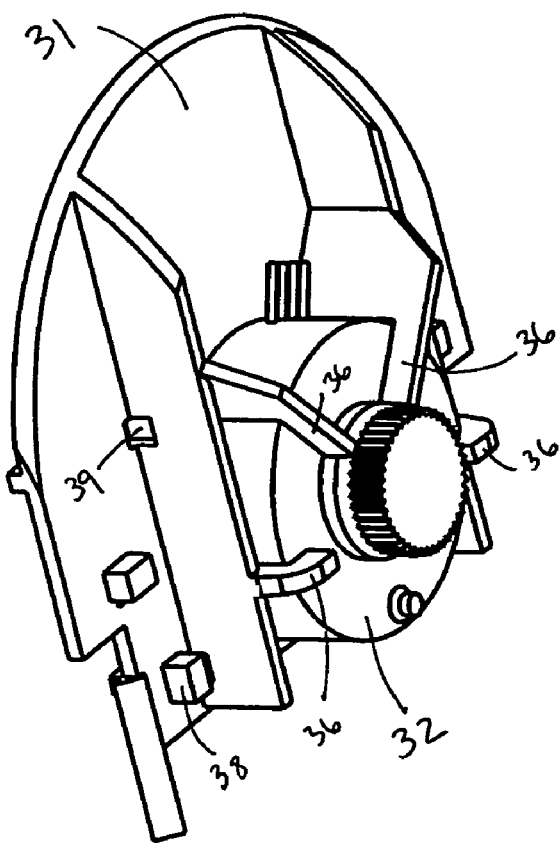
FIG. 3A is a detailed front perspective view of an embodiment of a pan motor and bracket assembly of the present invention.
Figure 3B:
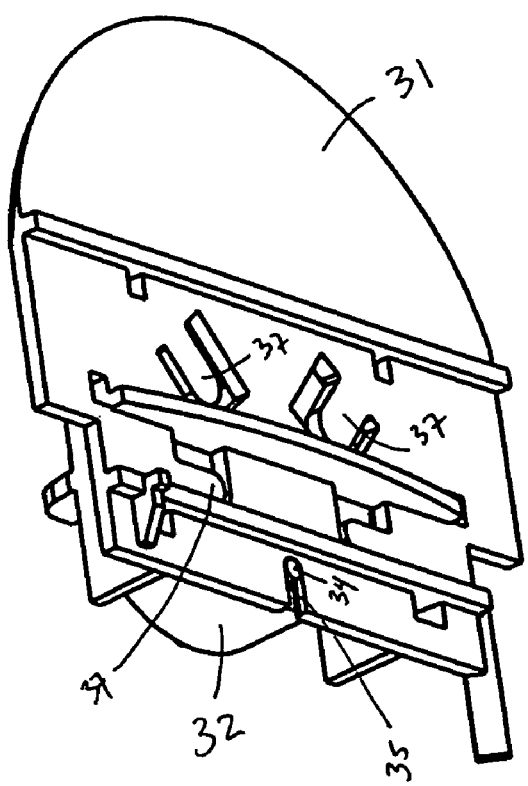
FIG. 3B is a detailed back perspective view of the pan motor and bracket assembly of FIG. 3A.
Figure 4:
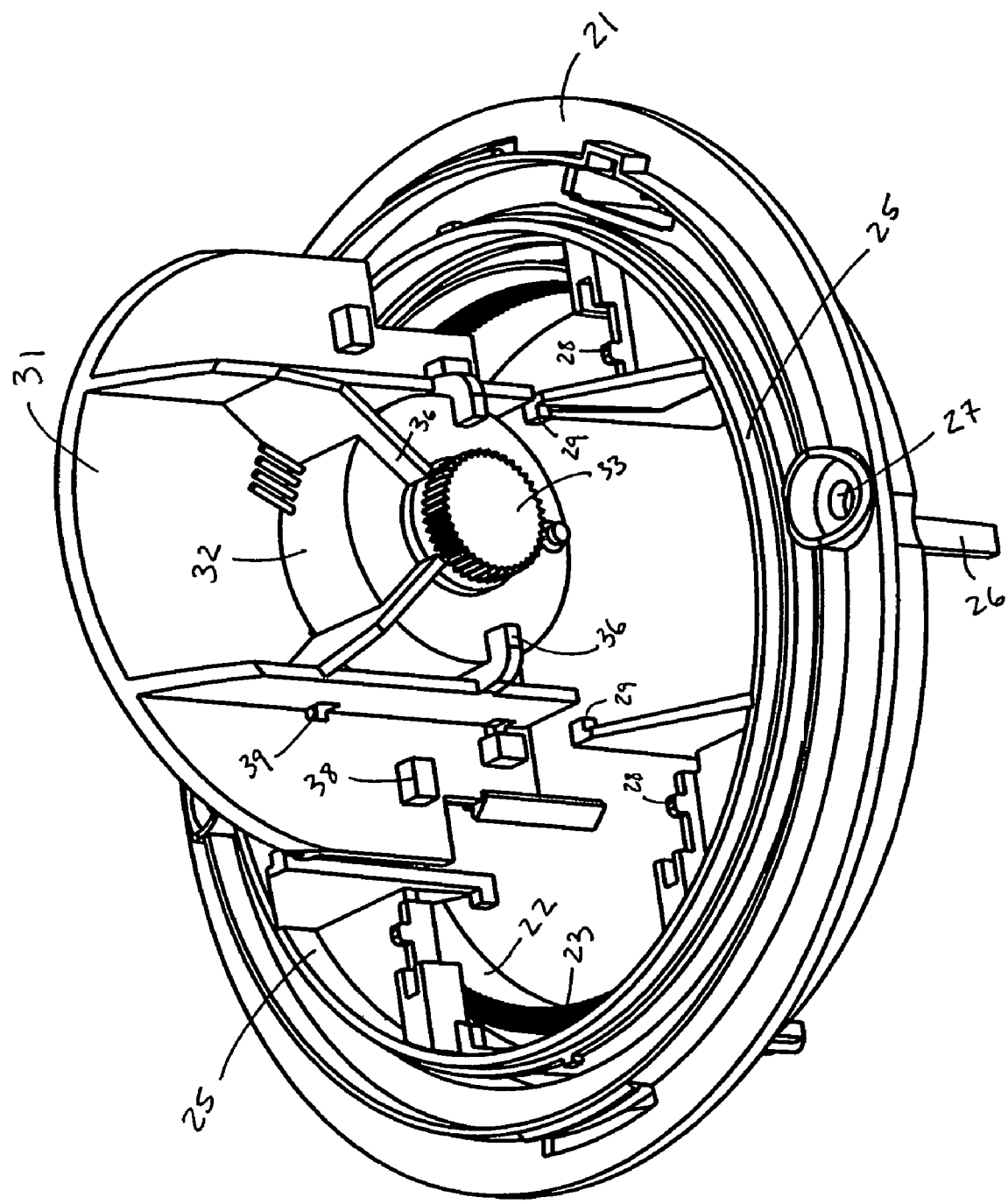
FIG. 4 is a perspective view of a pan motor and bracket assembly prior to attachment to the movable ring of the present invention.
Figure 5:
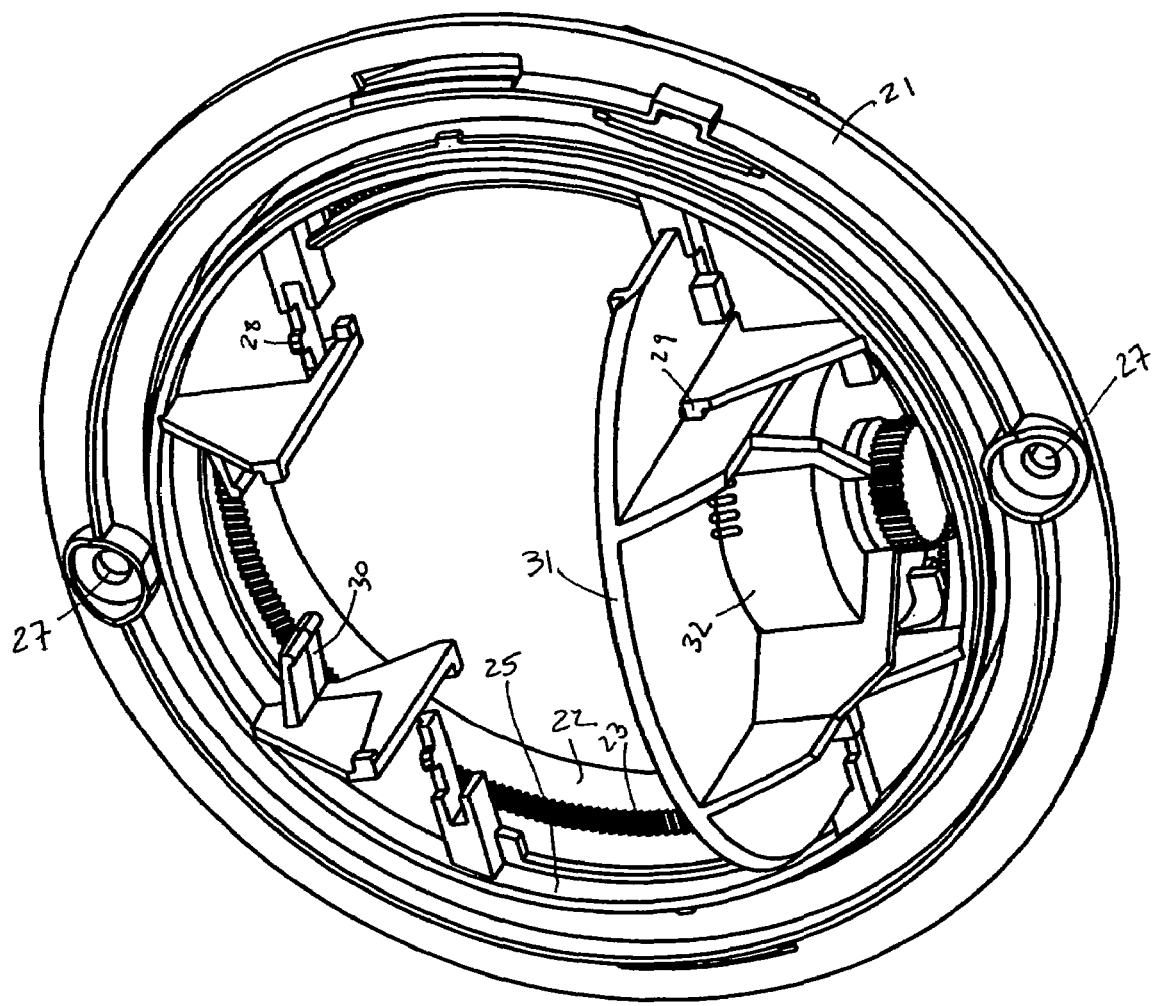
FIG. 5 is a front perspective view of the pan motor and bracket assembly of FIG. 4 attached to the movable ring.
Figure 6:
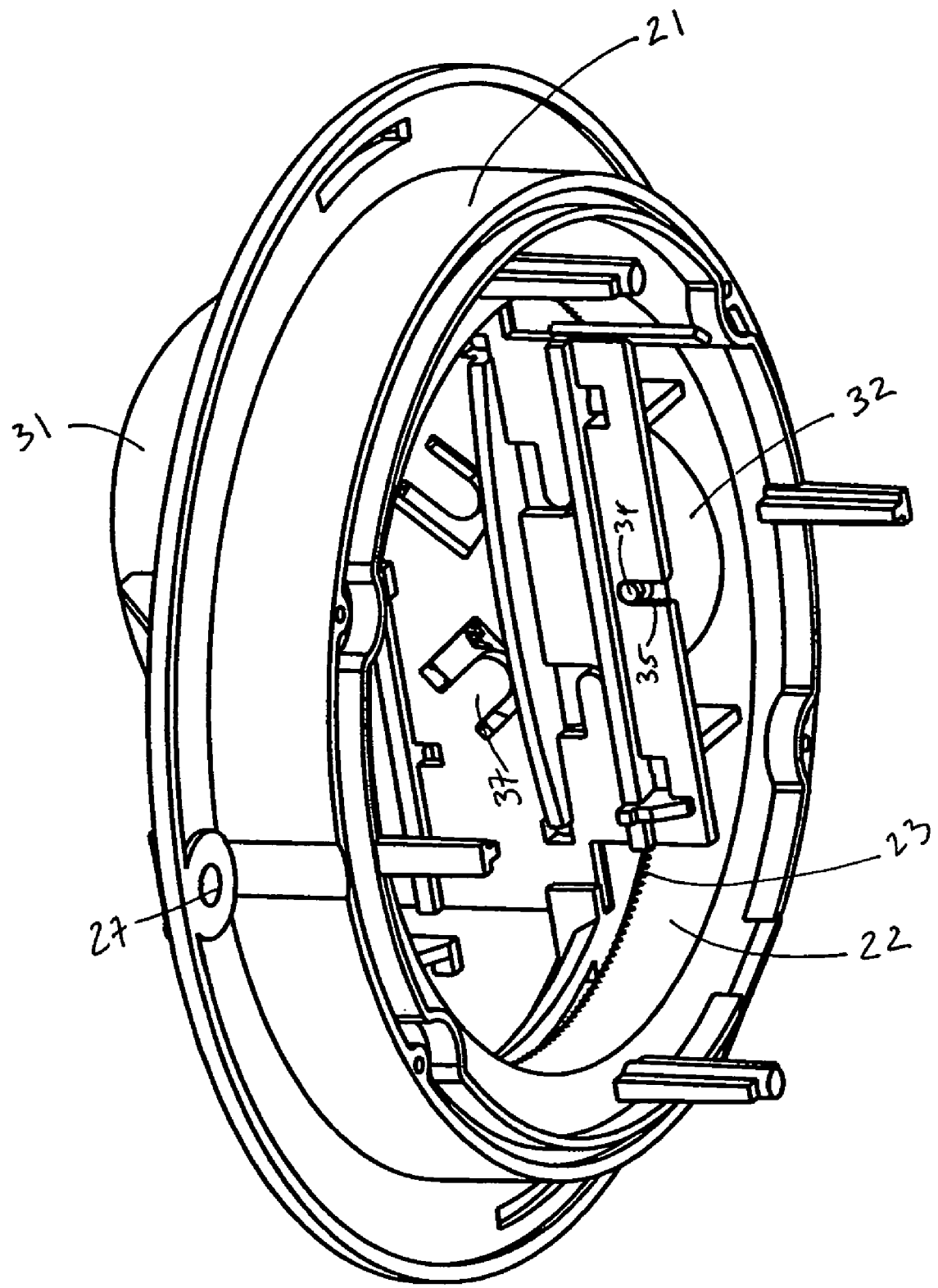
FIG. 6 is a rear perspective view of the attached pan motor and bracket assembly of FIG. 5.
Figure 7:
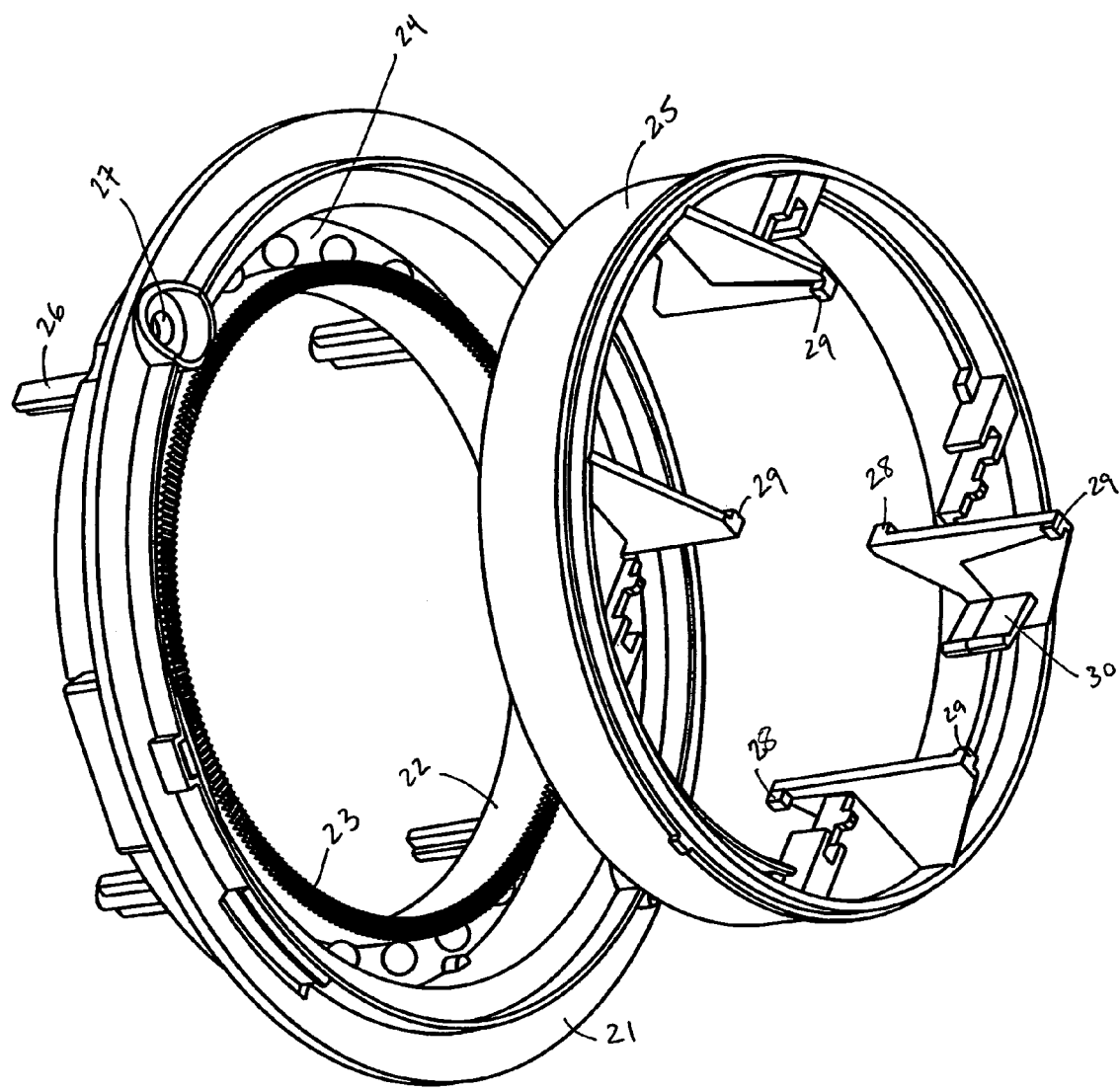
FIG. 7 is an exploded perspective view of a base and ring assembly of the present invention.
Figure 8:
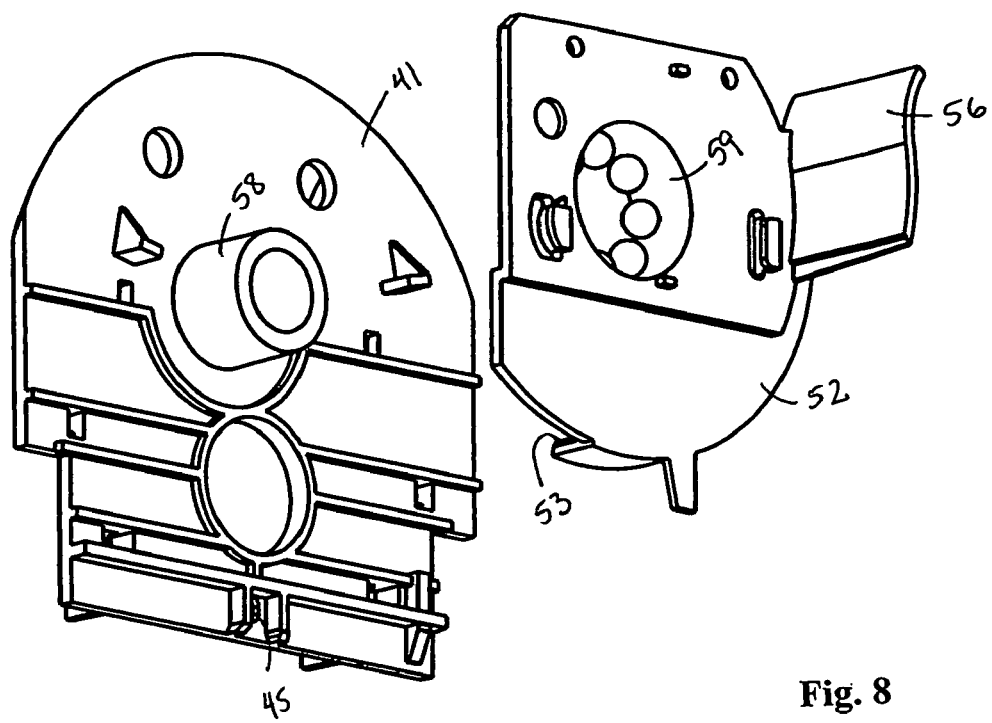
FIG. 8 is a side exploded perspective view of a camera bracket and tilt motor bracket of the present invention.
Figure 8A:
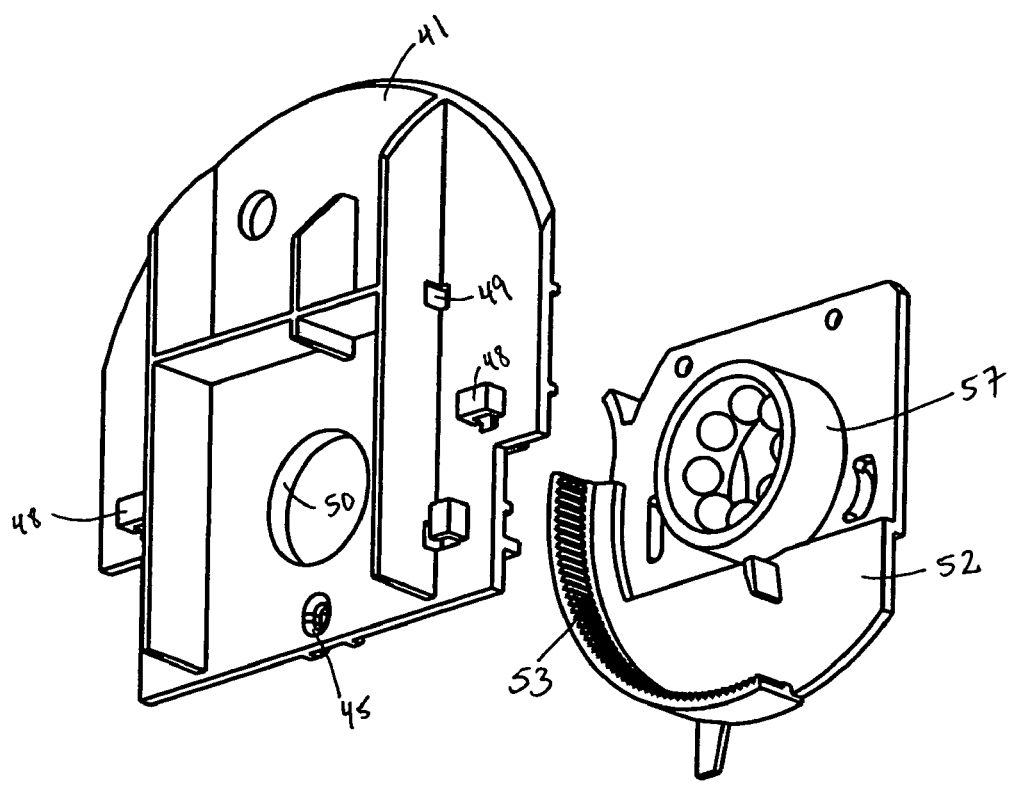
FIG. 8A is an opposite side exploded perspective view of the camera bracket and tilt motor bracket of FIG. 8.
Figure 9:
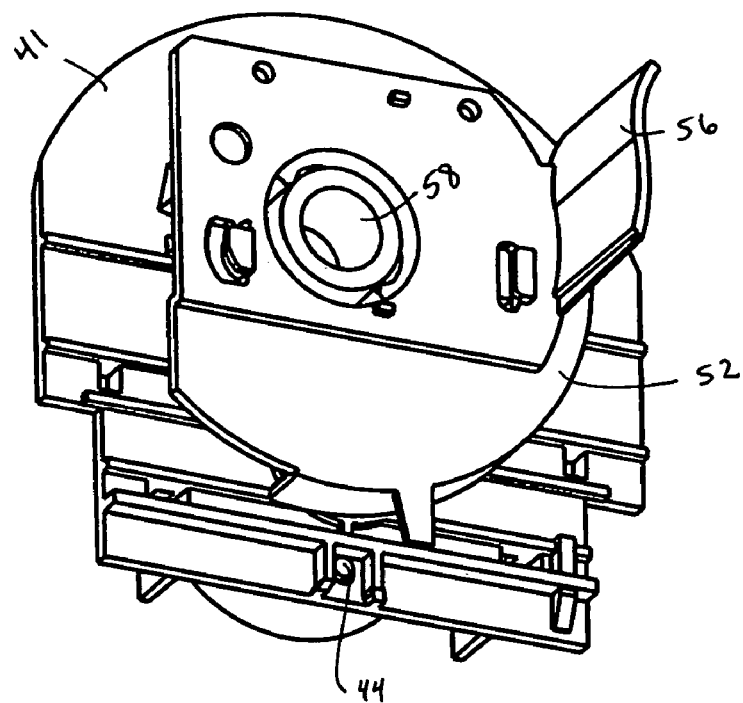
FIG. 9 is a side perspective view of the assembled camera bracket and tilt motor bracket of FIG. 8.
Figure 9A:
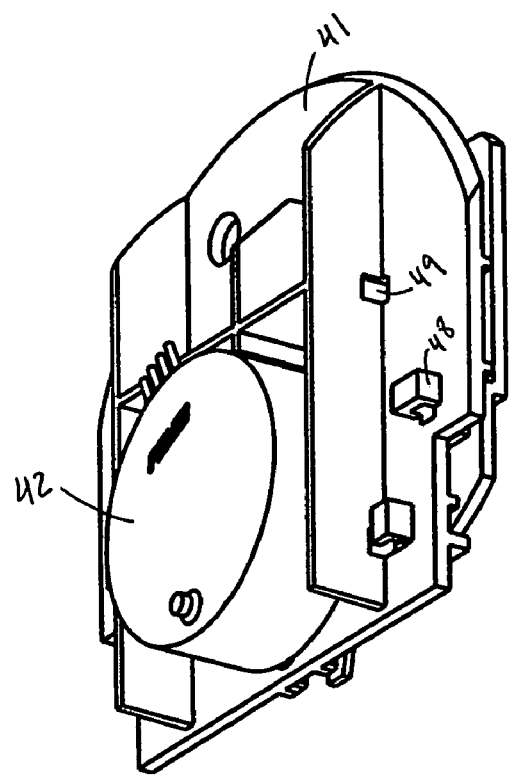
FIG. 9A is an opposite side perspective view of the assembled camera bracket and tilt motor bracket of FIG. 9.
Figure 10:
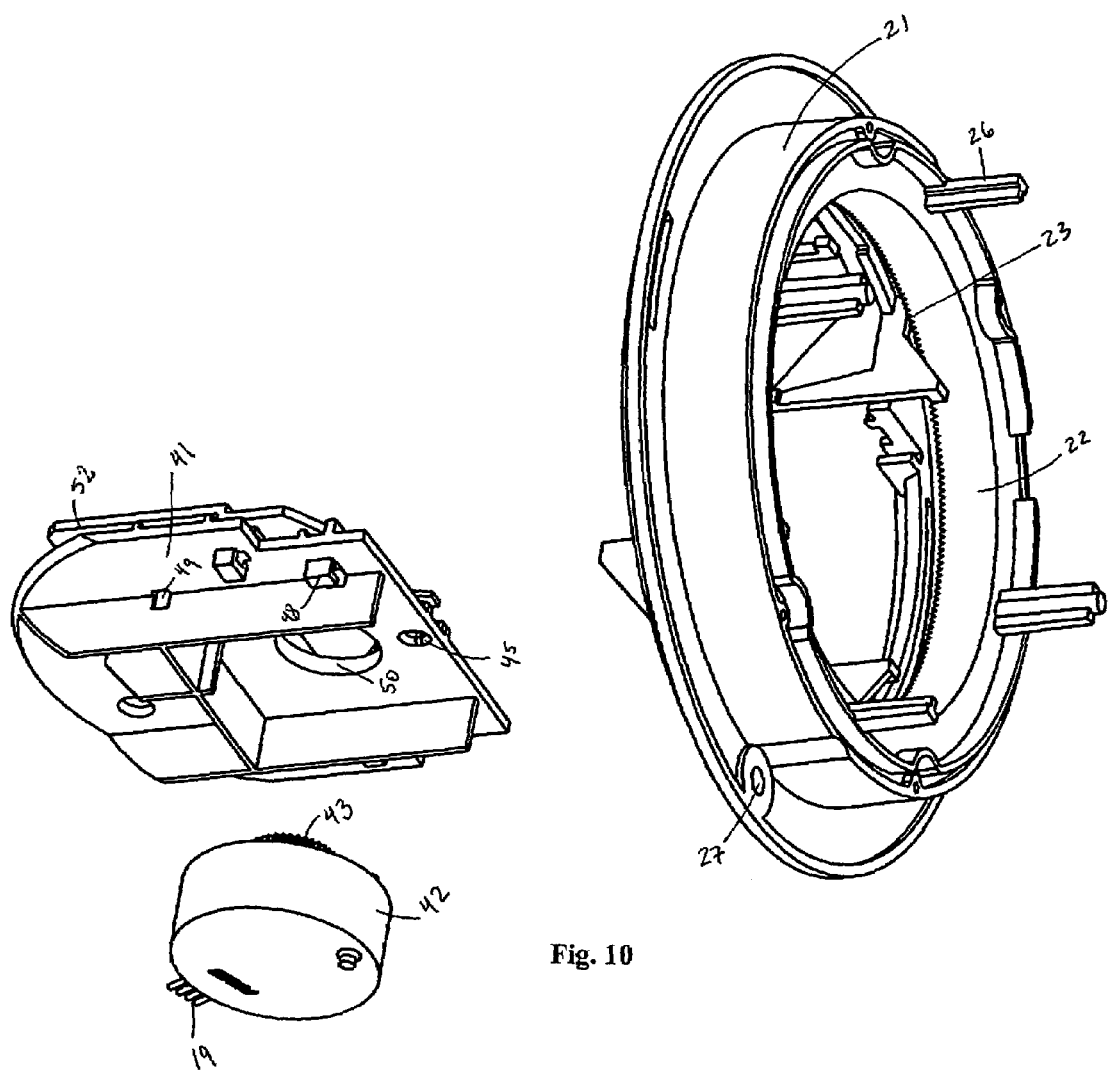
FIG. 10 is a side perspective and partially exploded view an embodiment of the present invention showing a tilt motor mounting assembly.
Figure 11:
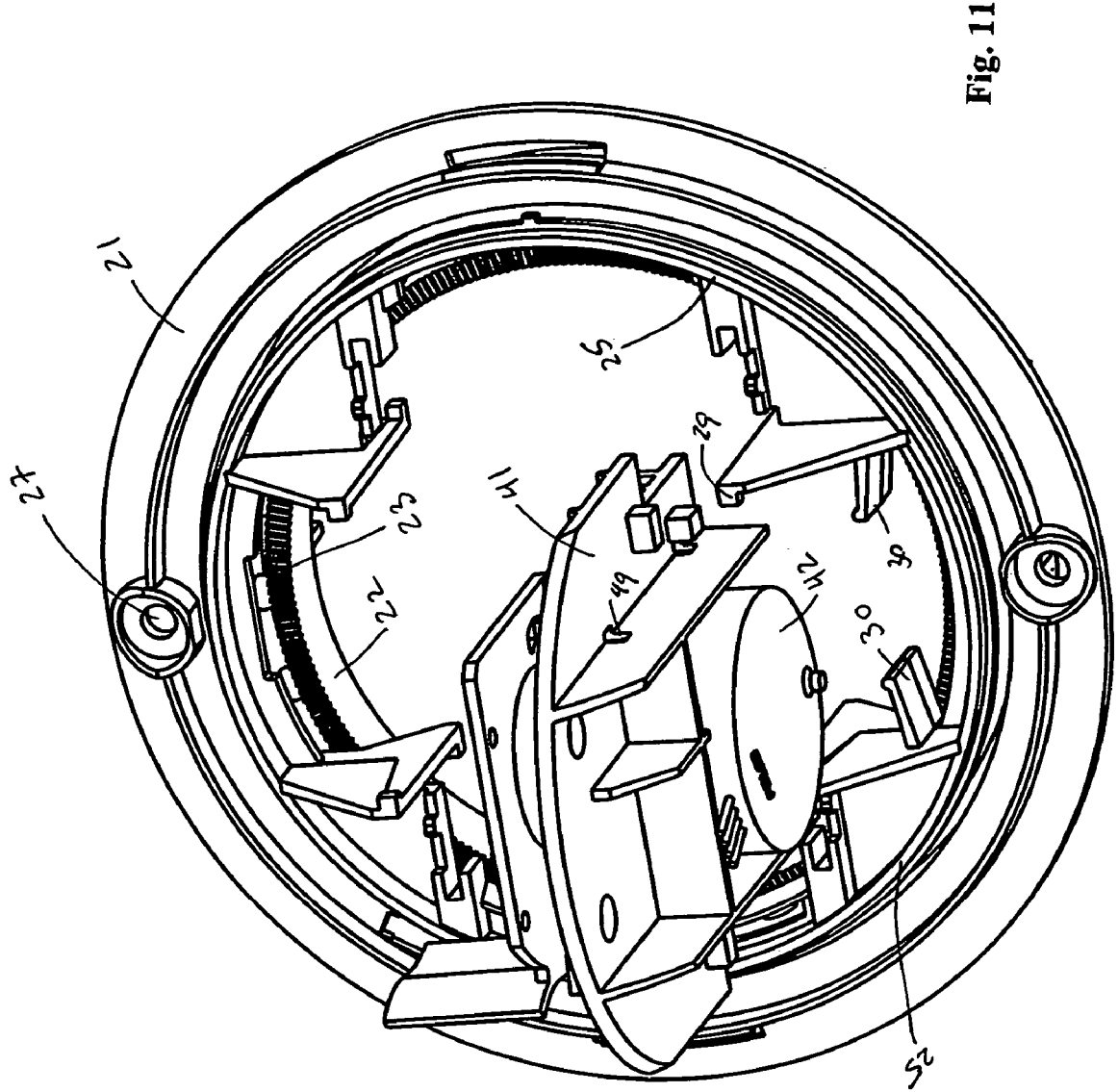
FIG. 11 is a perspective view of a tilt motor and bracket assembly prior to attachment to the movable ring of the present invention.
Figure 12:
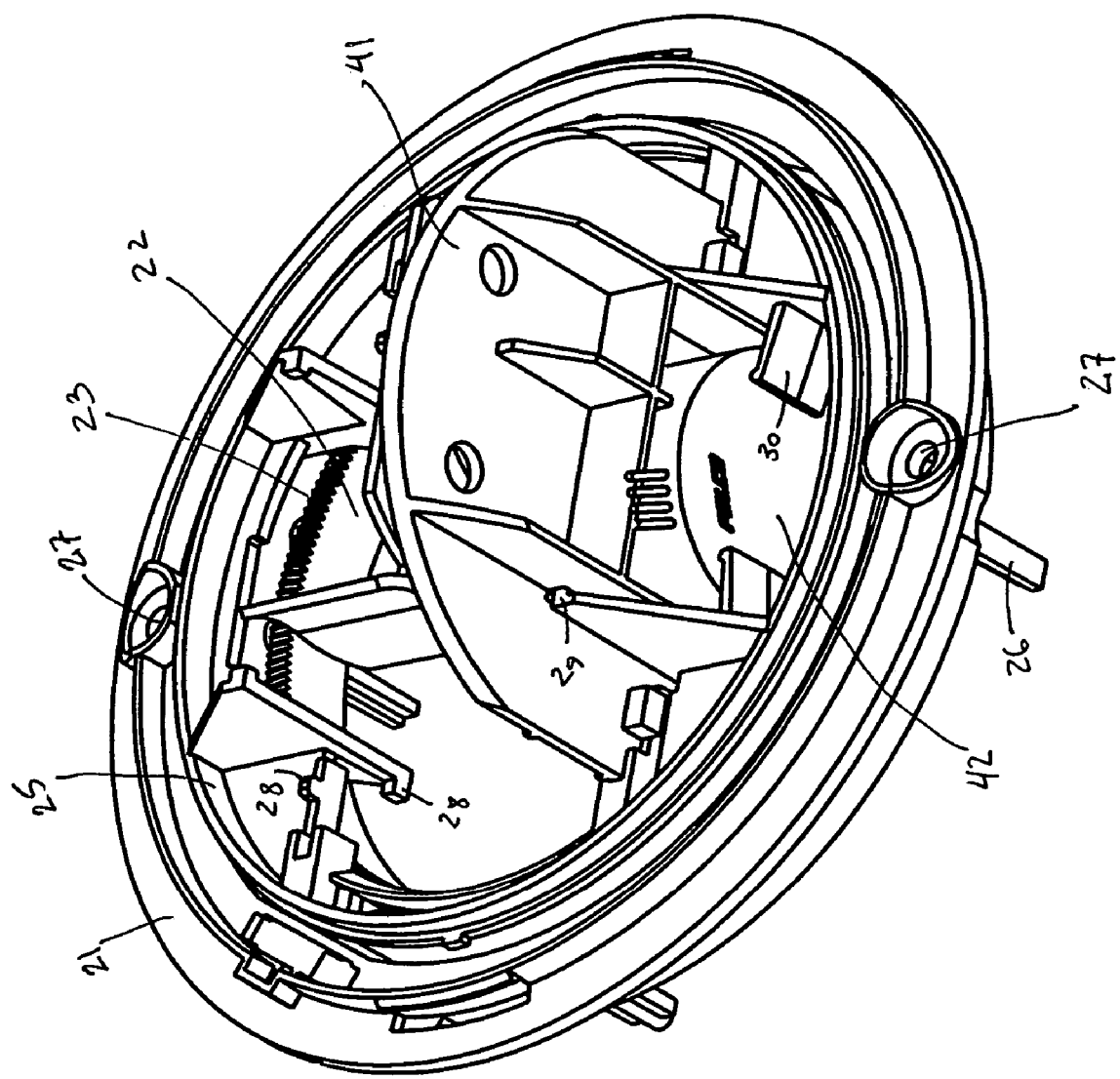
FIG. 12 is a front perspective view of the motor and bracket assembly of FIG. 11 attached to the movable ring.
Figure 13:
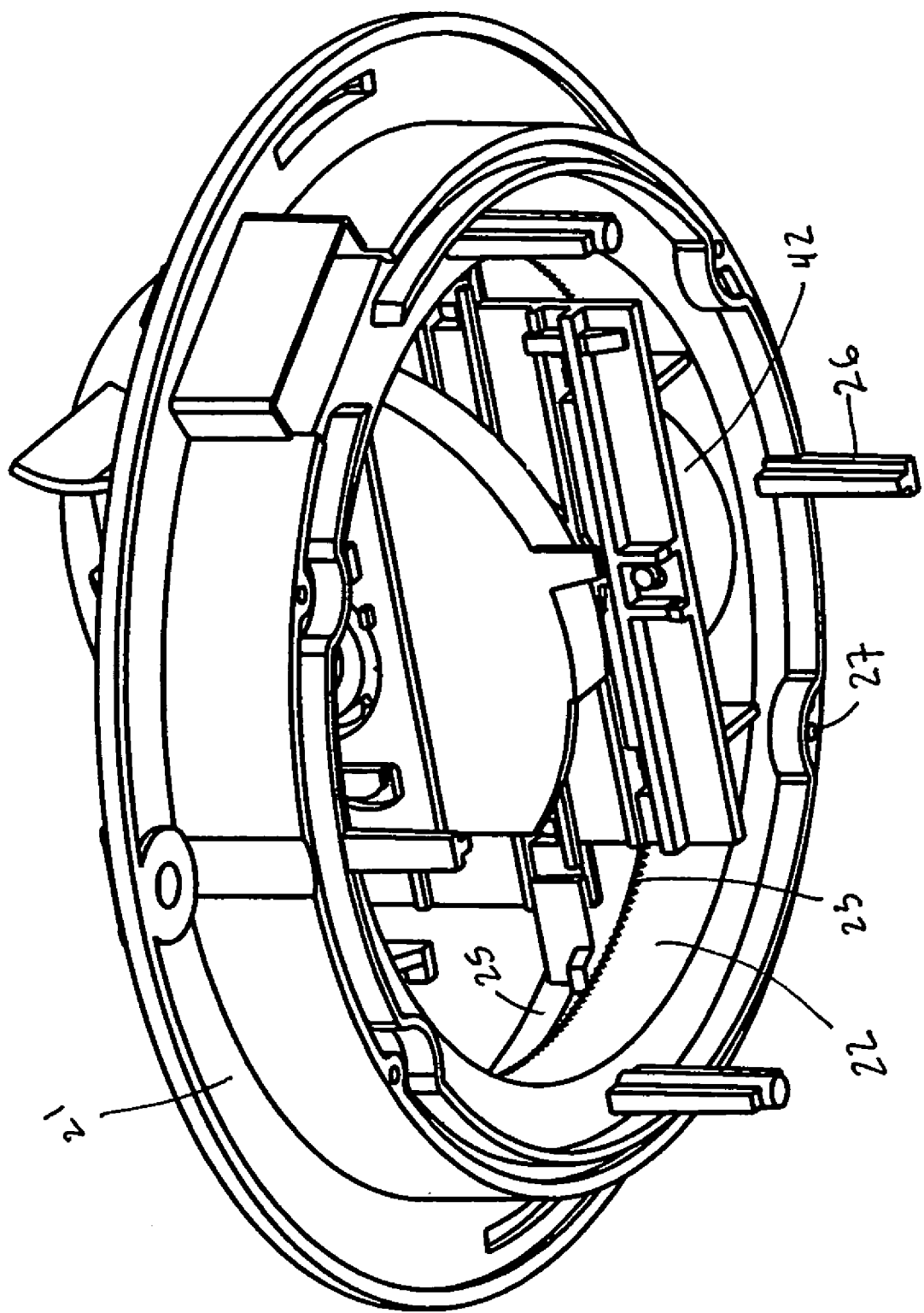
FIG. 13 is a rear perspective view of the motor and bracket assembly of FIG. 11 attached to the movable ring.
Figure 14:
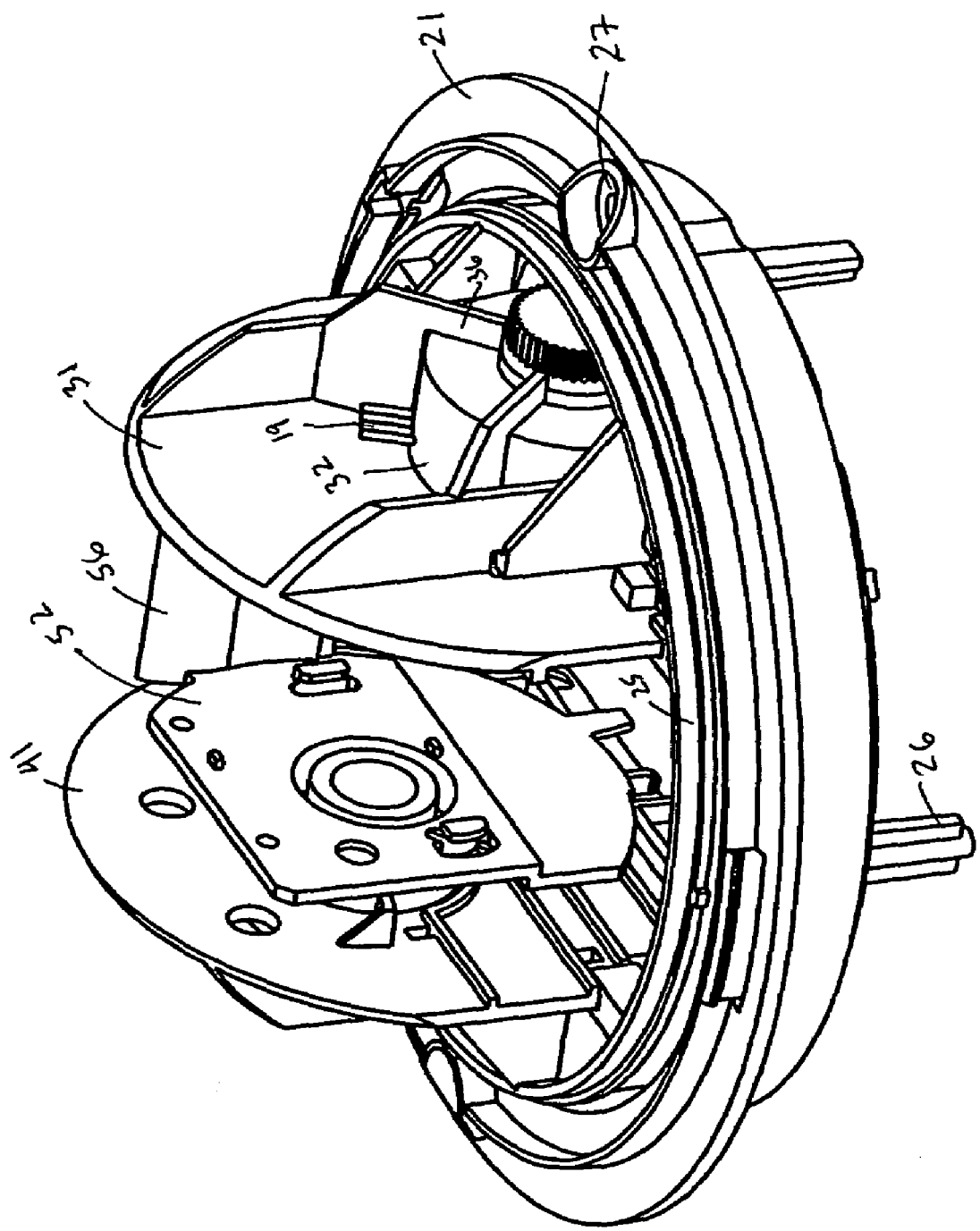
FIG. 14 is a front perspective view of both pan and tilt motor and bracket assemblies attached to the movable ring.
Figure 15:
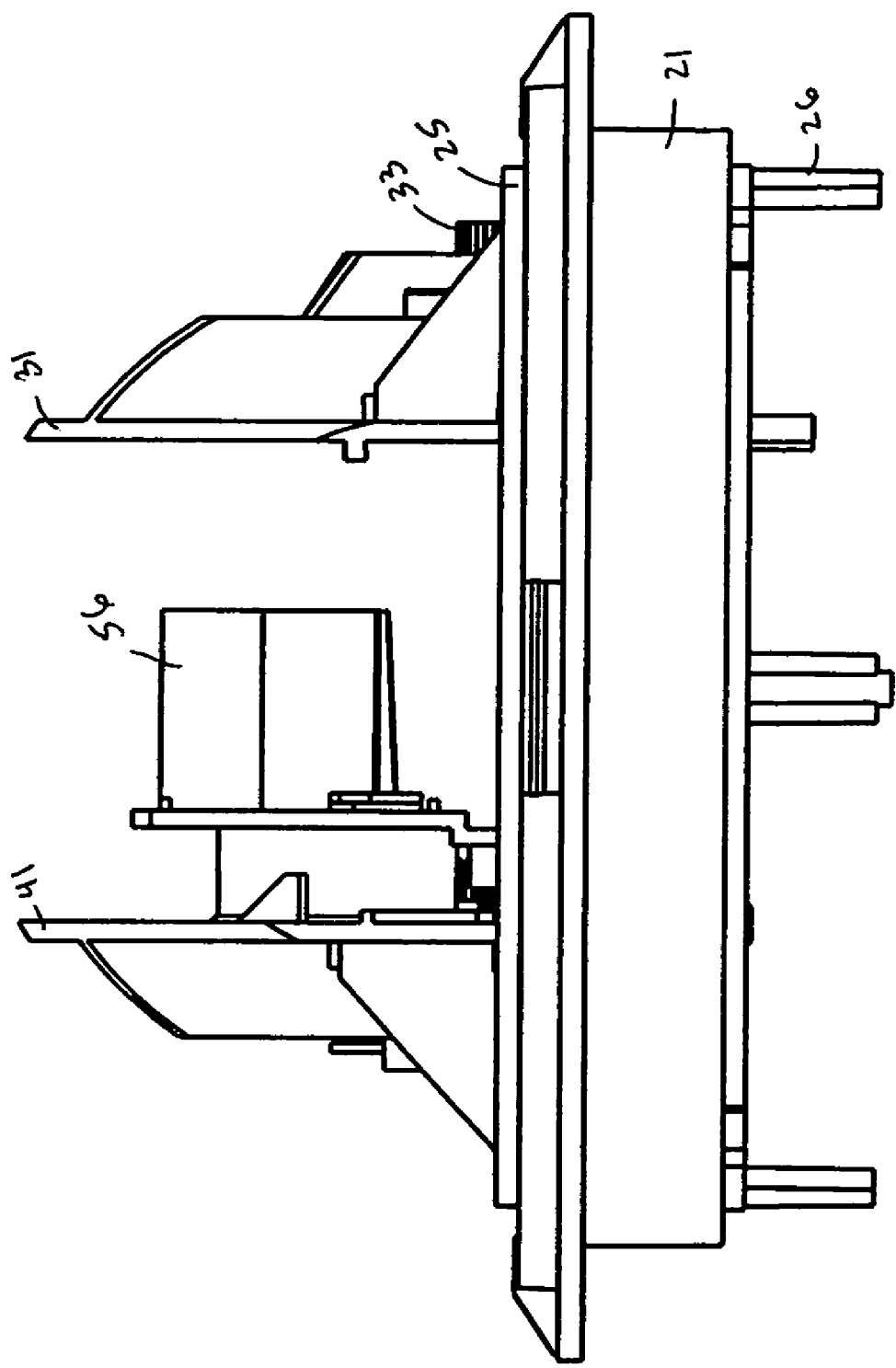
FIG. 15 is a side view of the assembly of FIG. 14.
Figure 16:
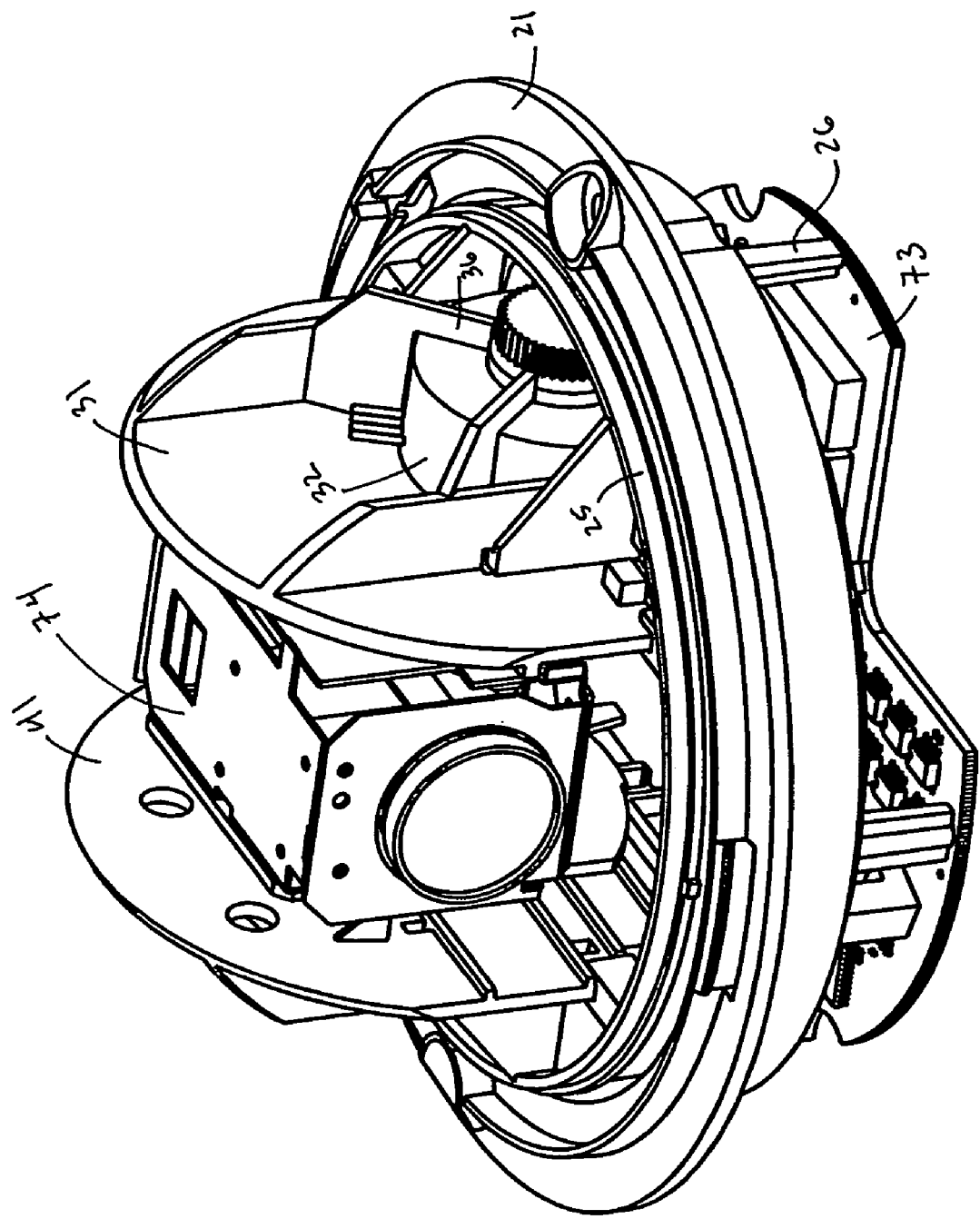
FIG. 16 is a front perspective view of an assembled version of the present invention including both pan and tilt motor and bracket assemblies, camera and electronic printed circuit board.

Referring to the exemplary embodiment illustrated in the drawings wherein like reference characters designate like or corresponding parts throughout the several views, and referring particularly to FIG. 1, it is seen that the present invention includes a base 21 defining an immovable inner ring 22, and a movable outer ring assembly 25 rotatably journaled to the inner ring. An annular groove 24 (see FIG. 7) is provided on the inner ring for receiving the outer ring assembly 25, and ball bearings or the like. An annular lip may be used to hold the inner ring in place in the groove. One or more motor mounting brackets 31, 41 are provided to support, respectively, pan and tilt motors 32, 42 that are used to move a camera 74. Cables 19 provide power and control signals to motors 32 and 42. A transparent dome 55 is provided to cover the camera and motors, and a trim piece 51 is used to hold dome 55 onto base 21. A dome insert 18 may also be provided to stabilize the unit. Base 21 may be fixedly mounted to a surface or structure using fasteners inserted through openings 27, or other suitable means. Electronics and a heat sink may be attached using legs 26.

A first motor mounting bracket 31 may be provided for supporting a pan motor 32, as shown in FIGS. 2-6. Motor 32 is provided with a gear 33 having teeth that engage corresponding teeth 23 located on inner ring 22. As described more fully below, when gear 33 is engaged with teeth 23, operation of motor 32 causes gear 33 to turn, imparting rotational movement (panning) to movable ring 25.

Bracket 31 is provided with at least one structure for holding pan motor 32 in place on bracket 31. In the illustrated embodiment, at least one boss register 36 and corresponding tension tab 37 is provided. Each boss register 36 is in the form of a fixed-position arm under which motor 32 is placed. Each tension tab 37 is provided on bracket 31 on the opposite side of the motor 32 from its corresponding boss register 36. Tension tab 37 presses motor 32 against boss register 36 to hold the motor in place. Multiple sets of registers and tension tabs (4 sets are shown in the illustrated exemplary embodiment) may be employed to provide added securement of the motor 32 to bracket 31. In one embodiment, motor 32 is provided with at least one pin register 34 that is aligned with and fits into a slot 35 in bracket 31 when motor 32 is mounted, in order to assure proper positioning of motor 32 relative to bracket 31.

At least one locking structure is provided on bracket 31 to secure it to movable ring 25. In the illustrated embodiment, one or more openings 39 are provided on bracket 31 which receive the tabs 29 of corresponding locking pins located on ring 25. Tabs 29 are mounted to members that are slightly deformable so as to allow tabs 29 to be moved for insertion into or removal from openings 39. It is to be appreciated that the positions of the opening 39 and tab 29 may be reversed such that the opening 29 is located on ring 25 and tab 29 is located on bracket 31.

Other alignment structures may be employed to assure proper positioning of bracket 31 in ring 25. In one embodiment, one or more positioning tabs 38 may be provided on bracket 31 for engagement with corresponding tabs 28 on ring 25 when bracket 31 is engaged with ring 25.

A second motor mounting bracket 41 may be provided for supporting a tilt motor 42, as shown in FIGS. 8-13. Motor 42 is provided with a gear 43 having teeth that engage corresponding teeth 53 located on camera bracket 52. When gear 43 is engaged with teeth 53, operation of motor 42 causes gear 43 to turn, imparting movement (tilting) to camera bracket 52.

A camera 74 is fixedly attached to flange 56 of tilt bracket 52. Tilt bracket 52 is, in turn, rotatably attached to tilt motor support bracket 41 through the journaling of opening 59 over bearing 58. This attachment allows camera bracket 52 to rotate relative to motor bracket 41. Rotational movement is imparted to camera bracket 52 by tilt motor 42. Motor 42 is engaged with bracket 41 by passing gear 43 through opening 50 in bracket 41 such that gear 43 engages teeth 53 on camera bracket 52. In one embodiment, motor 42 is provided with at least one pin register 44 that fits into an opening 45 in bracket 41 when motor 42 is mounted, in order to assure proper positioning of motor 42 relative to bracket 41.

As with pan motor bracket 31, at least one locking structure is provided on tilt motor bracket 41 to secure it to movable ring 25. In the illustrated embodiment, one or more openings 49 are provided on bracket 41 which receive the tabs 29 of corresponding locking pins located on movable members on ring 25. It is to be appreciated that the positions of the opening 49 and tab 29 may be reversed, such that the opening 49 is located on ring 25 and tab 29 is located on bracket 41. In addition, one or more tension members 30 are provided on ring 25 to hold motor 42 in place against bracket 41. Other alignment structures may be employed to assure proper positioning of bracket 41 in ring 25. In one embodiment, one or more positioning tabs 48 may be provided on bracket 41 for engagement with corresponding tabs 28 on ring 25 when bracket 41 is engaged with ring 25.

It is to be appreciated that in alternative embodiments, tension members 30 may be provided on bracket 41 instead of ring 25 to hold motor 42 in place. Alternatively, tension members 30 may be replaced by boss registers and tension tabs 36, 37. Similarly, it is to be appreciated that registers 36 and tension tabs 37 may be replaced by tension members 30.

In other embodiments, a dome insert 18 may be provided which fits or snaps into ring 25 using frictional fingers 20. Insert 18 includes an elongated opening for the lens of the camera to allow the camera to tilt through approximately ninety degrees of motion with an unobstructed view. Insert 18 moves with rotatable ring 25 when pan motor 32 is operated.

Figure 17:
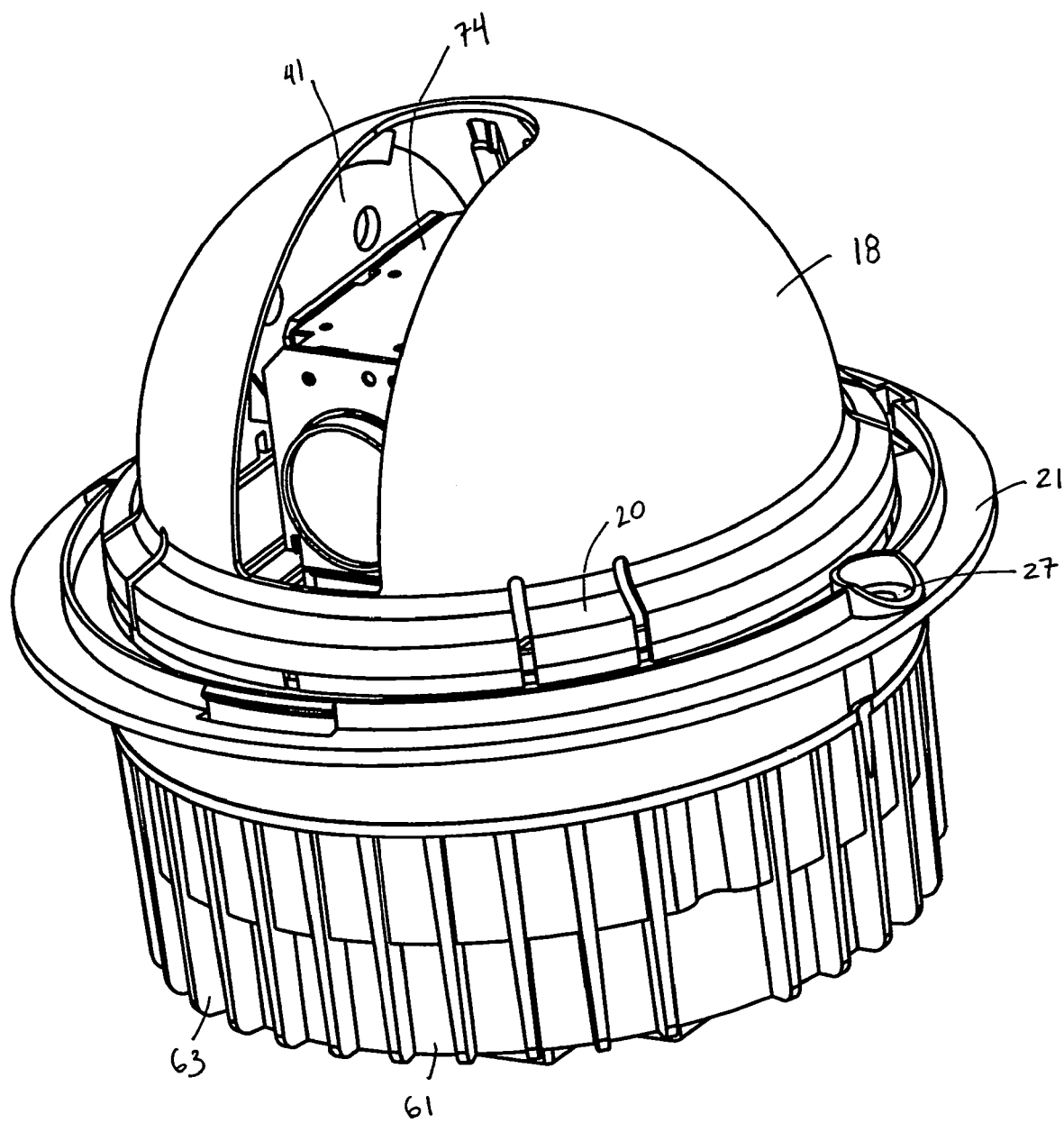
FIG. 17 is a perspective view of the assembled version of FIG. 16 also including a heat sink and stabilizing dome insert.
Figure 18:
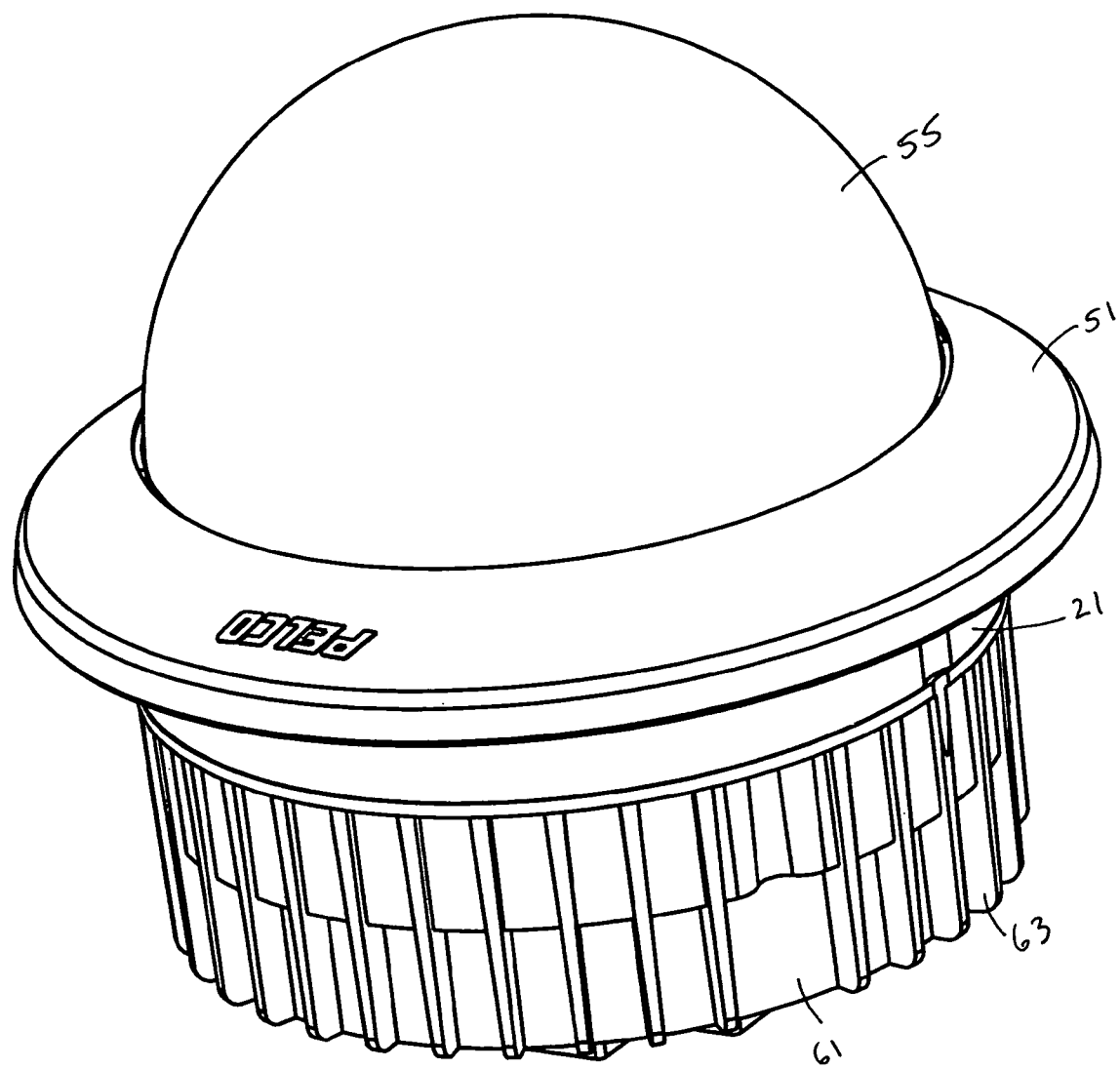
FIG. 18 is a perspective view of the assembled version of FIG. 17 also including the outer dome and trim ring.
Figure 19:
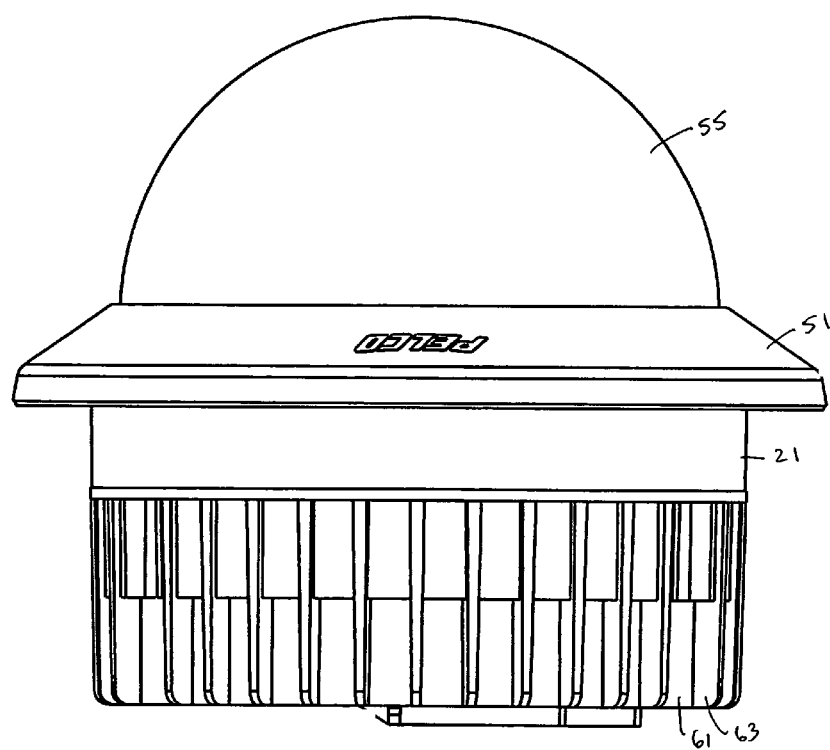
FIG. 19 is a side view of the assembled version of FIG. 18.

In other embodiments shown in FIGS. 17-19, a heat sink 61 is provided that attaches to a printed circuit board 73 to dissipate heat away from the sensitive electronic components on the board that operate the camera and motors. A plurality of radially extending fins or flanges 63 are provided on heat sink 61 to further dissipate heat. In the preferred embodiment, an outer transparent dome 55 is provided, and a trim ring 51 is used to secure dome 55 in place.

It is to be appreciated that brackets 31 and 41 are attached to ring 25 without the use of any hardware such as a screw, bolt, nut, rivet, stud or other similar fastener. Brackets 31 and 41 may be easily attached to or removed from ring 25. Similarly, it is to be appreciated that motors 32 and 42 are engaged with their corresponding bracket without the use of any hardware such as a screw, bolt, nut, rivet, stud or other similar fastener. Motors 32 and 42 may be easily attached to or removed from their respective brackets. Finally, it is to be appreciated that no separate boss or bearing is provided between ring 25 and base 21.

Further, although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A support assembly for a camera comprising:
   a base having an inner annular ring,
   an outer ring assembly movably attached to said inner ring, and
   at least one motor mounting bracket having a camera bracket movably attached thereto, said motor mounting bracket being attached to said outer ring assembly without the use of any separate hardware fastener.

2. The support assembly of claim 1 wherein said motor mounting bracket is attached to said outer ring assembly using at least one locking tab with corresponding slot.

3. The support assembly of claim 2 wherein said at least one locking tab is provided on a movable member to allow for insertion and removal from the corresponding slot.

4. The support assembly of claim 1 wherein a motor is engaged with said motor mounting bracket without the use of any separate hardware fastener.

5. The support assembly of claim 4 wherein said motor is engaged with said bracket using a member selected from the group of a register pin with corresponding slot, a boss register with corresponding tension tab, a tension member, and combinations thereof.

6. The support assembly of claim 4 wherein a second motor mounting bracket is attached to said outer ring assembly without the use of any separate hardware fastener.

7. The support assembly of claim 6 wherein said a second motor is engaged with said second bracket using a member selected from the group of a register pin with corresponding slot, a boss register with corresponding tension tab, a tension member, and combinations thereof.

8. The support assembly of claim 7 wherein each of said motor mounting brackets is attached to said outer ring assembly using at least one locking tab with corresponding slot.

9. The support assembly of claim 8 wherein each of said locking tabs are provided on a movable member to allow for insertion and removal from the corresponding slot.

10. The support assembly of claim 9 wherein a dome insert having a camera opening therein is attached to said outer ring partially covering said motor support brackets and motors.

11. The support assembly of claim 1 wherein said outer ring is journaled directly to said inner ring using an annular channel on said inner ring having ball bearings provided therein.

12. The support assembly of claim 1, further comprising a second motor mounting bracket attached to said outer ring assembly without the use of any separate hardware fastener.

13. The support assembly of claim 12, wherein said second motor mounting bracket is attached to said outer ring assembly using at least one locking tab with corresponding slot.

14. The support assembly of claim 13, wherein said locking tab is provided on a movable member to allow for insertion and removal from the corresponding slot.

15. The support assembly of claim 12, further comprising a second motor, wherein said second motor is engaged with said second motor mounting bracket using a member selected from the group of a register pin with corresponding slot, a boss register with corresponding tension tab, a tension member, and combinations thereof.

16. The support assembly of claim 12, wherein a dome insert having a camera opening therein is attached to said outer ring assembly partially covering said second motor mounting bracket and said second motor.

17. The support assembly of claim 1, further comprising a dome insert having a camera opening therein and covering said at least one motor mounting bracket, wherein said dome insert is attached to said outer ring assembly without the use of any separate hardware fastener.

18. A support assembly for a camera comprising:
a base having an inner annular ring,
an outer ring assembly movably attached to said inner ring,
a first motor mounting bracket having a camera bracket movably attached thereto, said first motor mounting bracket being attached to said outer ring assembly using at least one locking tab provided on a movable member and a corresponding slot,
a first motor engaged with said first motor mounting bracket without the use of any separate hardware fastener,
a second motor mounting bracket attached to said outer ring assembly using at least one locking tab provided on a movable member and a corresponding slot, and
a second motor engaged with said second motor mounting bracket using a member selected from the group of a register pin with corresponding slot, a boss register with corresponding tension tab, a tension member, and combinations thereof.

19. The support assembly of claim 18 wherein a dome insert having a camera opening therein is attached to said outer ring partially covering said motor support brackets and motors.

20. The support assembly of claim 18 wherein said outer ring is journaled directly to said inner ring using an annular channel on said inner ring having ball bearings provided therein.

21. A support assembly for a camera comprising:
a base means having an inner ring means,
an outer ring means movably attached to said inner ring means,
at least one motor mounting means having a camera support means movably attached thereto, said motor mounting means being attached to said outer ring means without the use of any separate hardware fastening means.

22. The support assembly of claim 21 wherein a motor means is engaged with said motor mounting means without the use of any separate hardware fastening means.

23. The support assembly of claim 22 wherein a second motor mounting means is attached to said outer ring means without the use of any separate hardware fastening means.

24. The support assembly of claim 23 wherein a second motor means is engaged with said second motor mounting means without the use of any separate hardware fastening means.

25. The support assembly of claim 24 wherein a dome insert means having a camera opening therein is attached to said outer ring means.

26. The support assembly of claim 21, further comprising a second motor mounting means attached to said outer ring means without the use of any separate hardware fastening means.

27. The support assembly of claim 26, further comprising a second motor means, wherein said second motor means is engaged with said second motor mounting means without the use of any separate hardware fastening means.

28. The support assembly of claim 21, further comprising a covering means for covering said motor mounting means and having an optical window, wherein said covering means is attached to said outer ring means without the use of any separate hardware fastening means.

29. A camera system comprising:
an annular inner ring,
an annular outer ring assembly movably attached to said annular inner ring, and
a motor mounting bracket,
wherein said motor mounting bracket is fixedly attached to said annular outer ring assembly without the use of any separate hardware fastener.

30. The system of claim 29, further comprising a tilt motor engaged with said motor mounting bracket without the use of any separate hardware fastener.

31. The system of claim 30, wherein said tilt motor is engaged with said motor mounting bracket using a member selected from the group of a register pin with corresponding slot, a boss register with corresponding tension tab, a tension member, and combinations thereof.

32. The system of claim 30, further comprising a camera bracket movably attached to said motor mounting bracket.

33. The system of claim 32, further comprising ball bearings located in an annular channel formed by said motor mounting bracket and said camera bracket.

34. The system of claim 32, wherein said tilt motor comprises a gear fixedly attached to one end of a rotating shaft.

35. The system of claim 34, wherein said camera bracket comprises teeth, said teeth corresponding to teeth of said gear of said tilt motor.

36. The system of claim 32, further comprising a camera engaged with said camera bracket without the use of any separate hardware fastener.

37. The system of claim 29, further comprising ball bearings located in an annular channel formed by said annular inner ring and said annular outer ring assembly.

38. The system of claim 29, further comprising a pan motor engaged with said motor mounting bracket without the use of any separate hardware fastener.

39. The system of claim 38, wherein said pan motor is engaged with said pan motor mounting bracket using a member selected from the group of a register pin with corresponding slot, a boss register with corresponding tension tab, a tension member, and combinations thereof.

40. The system of claim 38, wherein said pan motor comprises a gear fixedly attached to one end of a rotating shaft.

41. The system of claim 40, wherein said outer annular ring assembly comprises teeth, said teeth corresponding to teeth of said gear of said pan motor.

42. The system of claim 29, wherein said motor mounting bracket is fixedly attached to said annular outer ring assembly by an attachment system, said attachment system comprising a locking mechanism permanently located on said annular outer ring and a complementary locking mechanism permanently located on said motor mounting bracket.

43. The system of claim 29, further comprising a camera mounting means movably attached to said motor mounting bracket.

44. The system of claim 43, further comprising a means for moving said camera mounting means with respect to said motor mounting bracket.

45. The system of claim 44, wherein said means is attached to motor mounting bracket without the use of any separate hardware.

46. The system of claim 29, further comprising a means for moving said annular outer ring assembly with respect to said annular inner ring.

47. The system of claim 46, wherein said means is attached to said motor mounting bracket without the use of any separate hardware.

48. A camera support system comprising:

a base having an annular inner ring comprising a first axis, an annular outer ring assembly movably attached to said annular inner ring, a means for rotating said annular outer ring assembly around said first axis, a camera bracket, and a means for moving said camera bracket around a second axis, wherein said second axis is perpendicular to said first axis, wherein said means for moving said camera bracket and said means for rotating said annular outer ring assembly are attached to said annular outer ring without the use of any separate hardware fastener.

* * * * *